UNITED STATES PATENT OFFICE.

RICHARD LAUCH, OF ELBERFELD, GERMANY, ASSIGNOR TO THE FARBEN-FABRIKEN, VORMALS FR. BAYER & CO., OF SAME PLACE.

OLIVE DYE.

SPECIFICATION forming part of Letters Patent No. 479,515, dated July 26, 1892.

Application filed November 18, 1891. Serial No. 412,312. (Specimens.) Patented in France December 2, 1887, No. 187,365.

*To all whom it may concern:*

Be it known that I, RICHARD LAUCH, chemist, doctor of philosophy, (assignor to the FARBENFABRIKEN, VORMALS FR. BAYER & CO., at Elberfeld,) a subject of the German Emperor, and a resident of Elberfeld, Germany, have invented a new and useful Improvement in the Manufacture of Dye-Stuffs, of which I give in the following a clear and exact description, and for which the aforesaid FARBENFABRIKEN have already obtained Letters Patent in France, No. 187,365, dated December 2, 1887.

My invention relates to the manufacture of a new coloring-matter suitable for dyeing unmordanted cotton by treating with fuming sulphuric acid the dye-stuff which is obtained by reacting with one molecule of tetrazo-diphenyl upon one molecule of salicylic acid and one molecule of alpha-naphthylamine and by subsequently diazotizing the thus-obtained product and by combining the formed diazo compound with one molecular proportion of the sodium salt of the dihydroxynaphthaline monosulpho-acid described in the Letters Patent No. 444,679, dated January 13, 1891.

In carrying out my invention practically I proceed as follows: 28.2 kilos, by weight, of benzidine sulphate are finely suspended in water, mixed with 56.4 kilos of hydrochloric acid at 21° Baumé and diazotized by a watery solution of fourteen kilos of sodium nitrite. The thus-obtained solution of tetrazo-diphenyl is thereupon added to an icy-cold solution of fourteen kilos of salicylic acid that has been rendered alkaline by the addition of sodium carbonate. After standing for some hours the production of the intermediate substance is finished and a hydrochloric-acid solution of 14.3 kilos, by weight, of alpha-naphthylamine is added to the latter mixture. After some hours the formation of the azo compound containing molecular proportions of benzidine, salicylic acid, and alpha-naphthylamine is finished by heating for a short time at about 80° centigrade. By filtering the dark precipitate, by washing with water, and drying the intermediate dye-stuff is isolated.
Fifty kilos of this dried product are introduced in small portions into two hundred kilos of fuming sulphuric acid containing about twenty per cent. of anhydride, taking care that the temperature does not rise above 20° centigrade. When a test sample perfectly dissolves in sodium carbonate, the process of sulphonation is finished. The mixture then is poured on ice and the precipitate, thereby separating, is filtered off and washed with cold water. The thus-obtained new sulpho-acid is dissolved in alkali and mixed with a watery solution of seven kilos, by weight, of sodium nitrite. The mixture, after having been carefully cooled by ice, is acidulated on stirring by slowly adding muriatic acid. The precipitate, at first brown-black, gradually becomes clearer, and when after about twelve hours the diazotation is finished the brown-red precipitate is added to an alkaline solution of twenty-seven kilos, by weight, of the sodium salt of the dihydroxynaphthaline monosulpho-acid described in the Letters Patent No. 444,679, dated January 13, 1891, taking care by the addition of sodium carbonate that the liquid remains alkaline during the whole process. After some hours the mixture is heated to about 80° centigrade, whereby the coloring-matter is separated almost perfectly, and the quantity which remains in solution is salted out.

After having been filtered off and dried my new coloring-matter forms a brownish-black powder which is moderately soluble in cold, more easily in hot, water with olive color. It dissolves in sodium carbonate, with deep green, which is changed by an excess of the latter reagent into a brownish red. On addition of soda-lye or ammonia to the watery solution of the coloring-matter a brownish-red liquid results. When its watery solutions are mixed with acids, a grayish-green precipitate is separated, while the supernatant liquid becomes almost colorless. It is soluble in concentrated sulphuric acid, with a violet color, out of which solution a blackish-green precipitate separates on the addition of water. It produces on unmordanted cotton in an alkaline-soap bath olive-colored shades.

Having thus described my invention, what I claim as new, and desire to secure by Letters Patent, is—

1. The process of producing a new coloring-matter, which consists in reacting with one molecule of tetrazo-diphenyl upon one molecule of salicylic acid and one molecule of alpha-naphthylamine, treating said product with fuming sulphuric acid, diazotizing the thus-obtained sulphonated product, combining the so-formed diazo compound with one molecular proportion of the sodium salt of dihydroxy-naphthaline monosulpho-acid, and treating the dye-stuff thus obtained with fuming sulphuric acid.

2. The new dye-stuff hereinbefore described, which forms in a dry state a grayish-black powder difficultly soluble in cold water and more easily in hot water and soluble in diluted solutions of sodium carbonate, with olive color, which latter becomes brownish red by adding sodium carbonate in excess, soluble in soda-lye and ammonia, with brownish-red color, from which on the addition of acids a grayish-green fine precipitate separates, the liquid becoming almost colorless; in concentrated sulphuric acid it dissolves, with violet color, that turns green by adding water, but after some time a blackish-green precipitate separates and the liquid becomes almost colorless, and it dyes unmordanted cotton olive in alkaline-soap baths.

In testimony whereof I have signed my name in the presence of two subscribing witnesses.

RICHARD LAUCH.

Witnesses:
WM. ESSENWEIN,
RUDOLPH FRICKE.